(12) United States Patent
Garcia et al.

(10) Patent No.: US 8,305,915 B2
(45) Date of Patent: Nov. 6, 2012

(54) METHOD FOR THE DIGITAL EVALUATION OF A DATA TRANSMISSION NETWORK

(75) Inventors: Jean-Marie Garcia, Toulouse (FR); Olivier Brun, Aignes (FR); David Gauchard, Toulouse (FR)

(73) Assignee: QOS Design, Toulouse (FR)

( * ) Notice: Subject to any disclaimer, the term of this patent is extended or adjusted under 35 U.S.C. 154(b) by 727 days.

(21) Appl. No.: 11/886,414

(22) PCT Filed: Mar. 13, 2006

(86) PCT No.: PCT/FR2006/000553
§ 371 (c)(1),
(2), (4) Date: Apr. 16, 2010

(87) PCT Pub. No.: WO2006/095100
PCT Pub. Date: Sep. 14, 2006

(65) Prior Publication Data
US 2010/0195510 A1    Aug. 5, 2010

Related U.S. Application Data

(60) Provisional application No. 60/660,439, filed on Mar. 11, 2005.

(51) Int. Cl.
*G01R 31/08* (2006.01)
(52) U.S. Cl. ......................................... 370/252; 370/412
(58) Field of Classification Search .................. 370/252, 370/401, 412, 465, 413
See application file for complete search history.

(56) References Cited

U.S. PATENT DOCUMENTS

| | | | |
|---|---|---|---|
| 6,263,065 B1 * | 7/2001 | Durinovic-Johri et al. | ............... 379/266.03 |
| 6,820,042 B1 * | 11/2004 | Cohen et al. | ....................... 703/2 |
| 7,058,843 B2 * | 6/2006 | Wolf | .............................. 714/4.5 |

(Continued)

OTHER PUBLICATIONS

David Gauchard; "Simulation Hybride des Reseaux IP-DiffServ-MPLS Multi-services sur Environment d'Execution Distributee"; Apr. 26, 2003; pp. 1-14, 123-134; URL: http:/hal.ccsd.cnrs.fr/docs/00/04/90/98/PDF/tel--0001134.pdf (retrieved on Aug. 11, 2006.

(Continued)

*Primary Examiner* — Ricky Ngo
*Assistant Examiner* — Christine Ng
(74) *Attorney, Agent, or Firm* — Blakely, Sokoloff, Taylor & Zafman

(57) ABSTRACT

The invention relates to a method for the digital evaluation of a data transmission network comprising a plurality of nodes (1) and data transmission links (2) which extend between the nodes (1), each node comprising at least one input or output interface (11, 12) consisting of a plurality of queues which can each receive data in the form of analytical or event flows, said data flows being distributed into queues as a function of the service classes associated with the flow. The inventive method comprises the following steps consisting in: identifying the interfaces having a hybrid operating mode and each receiving at least one event data flow and at least one analytical data flow; and, for each interface having a hybrid operating mode, determining a virtual equivalent queue for the event data flows of a given service class (k) received by the interface, which is associated with the given service class (k), said virtual equivalent queue having an equivalent service rate (TRFE(k)), in order to evaluate the data transmission network by associating the virtual equivalent queue receiving the event data flows of the given service class (k) with the interface.

12 Claims, 9 Drawing Sheets

U.S. PATENT DOCUMENTS

Figure 1:
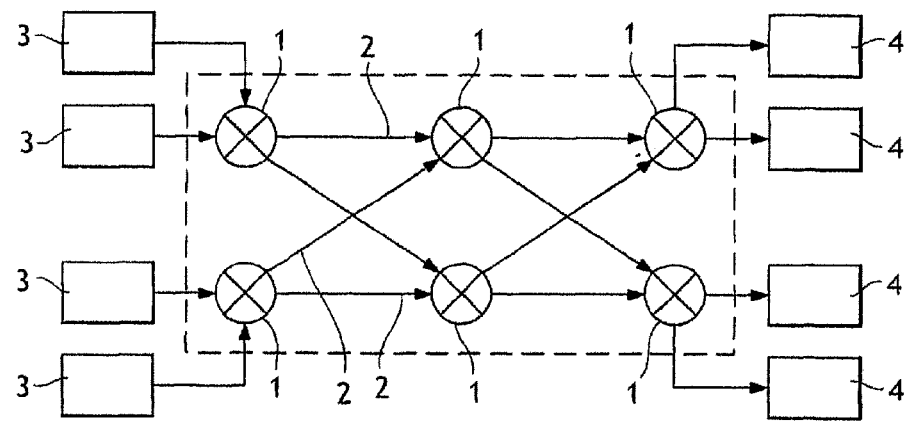

| | | | |
|---|---|---|---|
| 7,139,692 B2 * | 11/2006 | Cohen et al. | 703/21 |
| 7,219,047 B2 * | 5/2007 | Cohen et al. | 703/17 |
| 7,573,818 B2 * | 8/2009 | Vaananen et al. | 370/235 |
| 7,814,222 B2 * | 10/2010 | Venables | 709/232 |
| 2008/0279207 A1 * | 11/2008 | Jones | 370/412 |

OTHER PUBLICATIONS

Stephan Bohacek, et al.; "*A Hybrid Systems Modeling Framework for Fast and Accurate Simulation of Data Communication Networks*"; Jun. 10, 2003; pp. 58-69; URL: http://delivery.acm.org/10.1145/790000/781036/p58-bohacek.pdf?key1=781036&key2=4856825511&col 1 =ACM&d1=ACM&CFID=15151515&CFTOKEN=6184618 (retrieved on Aug. 11, 2006).

Yu Gu, et al.; "*On Integrating Fluid Models with Packet Simulation*"; pp. 2856-2866; Infocom 2004. Twenty-Third Annual Joint Conference of the IEEE Computer and Communications Societies Hong Kong, PR China Mar. 7-11, 2004, Piscataway, NJ, USA, IEEE.

Daniel R. Figueiredo, et al.; "*On the Efficiency of Fluid Simulation of Networks*"; Computer Networks, Elesevier Science Publishers B.V., Amsterdam, NL, vol. 50, No. 12;Aug. 2006; pp. 1974-1994.

* cited by examiner

METHOD FOR THE DIGITAL EVALUATION OF A DATA TRANSMISSION NETWORK

This is a non-provisional application claiming the benefit of International application number PCT/FR2006/000553 filed Mar. 13, 2006 and U.S. Provisional Patent Application No. 60/660,439 filed Mar. 11, 2005.

FIELD OF THE INVENTION

The invention concerns a method for the digital evaluation of a data transmission network.

The invention applies in particular to the digital evaluation of packet-switched data transmission networks, such as networks commonly known as IP networks (Internet Protocol), MPLS networks (MultiProtocol Label Switching) or ATM networks (Asynchronous Transfer Mode), for example.

STATE OF THE ART

The digital evaluation of networks can be used in particular in order to optimise the dimensioning and/or the operation of an actual network, to simulate the behaviour of a network following a change occurring to at least one of its elements, or in order to optimise the routing of data in a network.

We are already familiar with several types of method for the digital evaluation of such transmission networks.

In a first type of known method, a so-called event-based or stochastic evaluation is performed, which consists essentially, generally in a random manner, of generating data describing chronological events at the level of nodes of the network, concerning data stream packets transiting in the network. This method is used in particular to represent events occurring at the level of queues (buffer memories) of the hardware devices, such as reception events and packet restoration events.

The following references illustrate this first example of a known method:

*Simulation Modelling and Analysis* (Third Edition), Averill M. Law & W. David Kelton, Publisher: McGraw-Hill, 2000 (760 pages),

*Simulation*, by Sheldon M. Ross, Academic Press, 3rd edition (27 Dec. 2001), ISBN: 0125980531,

*Simulation Techniques for Discrete Event Systems* (Cambridge Computer Science Texts), I. Mitrani, 194 pages, Cambridge University Press (9 Dec. 1982), ISBN: 0521238854,

*Discrete-Event System Simulation*, 3rd Edition, Jerry Banks, John S. Carson, Barry L. Nelson, David M. Nicol, Prentice Hall, (15 Aug. 2000), ISBN: 0130887021.

A first example of an event-based evaluation method using the so-called Monte-Carlo technique, consists of determining a transient behaviour of the network from events drawn in a random manner in order to generate a set of possible behaviours. The transient behaviour of the network can be deduced from statistics on the behaviours generated. Another example of an event-based evaluation method according to the Monte-Carlo technique, consists of determining a behaviour in continuous working of the network from events drawn in a random manner. The Monte-Carlo technique produces precise results. It is used in particular to provide a representation of the entirely event-based streams within the network, which is necessary in order to simulate the circulation of the packets and to evaluate, in a precise manner, certain operating parameters of the current networks, such as the data packet loss phenomena and the causes of such losses, as well as delay and jitter. This is particularly true for networks used for the transmission of packets belonging to predetermined classes of service (the IP TOS field or the MPLS DSCP field, for example) of the services (audio, video, multimedia, data, interactive or not, etc.) for the IP (Internet Protocol), MPLS (MultiProtocol Label Switching), GPRS (General Packet Radio Service) or UMTS (Universal Mobile Telecommunication System) networks.

This type of event-based evaluation method nevertheless has the drawback of leading to very long computation times, which become prohibitive for evaluating the current actual networks, given the continuous increase in their size and their bandwidth, and therefore in the complexity of the routings, and in the large quantities of data to be transmitted for each transaction.

To reduce the computation times, different solutions have been proposed.

For example, a technique has been proposed for reducing variance. People have also envisaged the use of machines in parallel. Nevertheless, in practise, none of these techniques enable us to achieve adequate saving of time.

A second known type of evaluation consists of effecting a so-called differential analytical evaluation.

In this regard, reference can be made to the following publication:

*Differential traffic modelling and Distributed Hybrid Simulation*, Jean-Marie Garcia et al, Calculateurs Parallels, volume 13 number 6/2001, pages 635 to 664.

In analytical evaluation, each queue (buffer memory) of each hardware device in the data transmission network corresponds to a node in a packet queuing network, this network being described by:

a set of sources, with a speed $\lambda_k(t)$, producing packets going from an origin node o(k) to a destination node d(k), analytical equations that come from differential traffic theory, used to model nodes.

The general form of these equations is as follows:

$$\frac{dX_i^k(t)}{dt} = TE_i^k(t, k, \lambda_i^{s(1)}(t), \ldots \lambda_i^{s(i)}(t), X_i^{s(1)}(t), \ldots, X_i^{s(i)}(t), \mu) -$$
$$TS_i^k(t, k, \lambda_i^{s(1)}(t), \ldots, \lambda_i^{s(i)}(t), \ldots, X_i^{s(i)}(t), \mu)$$
$$k = s(1) \ldots s(K_i)$$

in which:

t is the time, $s(1) \ldots s(K_i)$ represents the $K_i$ streams arriving at node i, $K_i$ being a non-zero integer, $\lambda_i^k(t)$ and $X_i^k(t)$, with $k=s_i(K_i)$ are respectively the speeds and the loads induced by each source in node i, $\mu$ is the service speed, and $TE_i^k$ and $TS_i^k$ are the input and output speeds whose expressions are given by the differential analytical model concerned. This model, which is generally non-linear, is dependent upon the service (distribution) law, the arrival (distribution) law, and the fact that there exists a sequencing of the packets that is more-or-less complex, and capable of taking account of the classes of service for example.

In order to represent the transit of the packets from one node to another, it is necessary to couple these equations. This coupling is effected with coefficients $r_{ij}^k(t)$, with each coefficient determining a fraction of the traffic coming from source k in node i to be propagated to node j. In particular, coefficients $r_{ij}^k(t)$, with unitary or zero values, can be employed in order to represent a routing in which the entirety of the traffic k of each node i is propagated to a single node j.

Two types of analytical evaluations are known:

1) The transient analytical evaluation.

In this case, the evaluation is discretised by time intervals $\Delta t$. At each interval, and for each node i and each source k of the network, each parameter $TE_i^k$, is the sum of $r_{ij}^k(t) \cdot TS_j^k(t)$ (for all non-zero $r_{ij}^k(t)$), and the equations are integrated in order to update $X_i^k(t)$ and the output speeds $TS_i^k$.

2) The stationary analytical evaluation.

In this case, in the stationary state of the network, all the derivatives in relation to time are zero. The search for the stationary state consists of executing a fixed-point algorithm on all of the $TS_i^k$-$TE_i^k$ equations.

This type of evaluation, based on a fluid simulation of the data flows within the network, is relatively rapid, but nevertheless cannot be used to simulate, with precision, all the types of data flow capable of circulating in an actual network. Neither can this type of evaluation be used to observe the routing of a data packet in the network, nor to obtain data describing the events occurring to each packet. In other words, this differential analytical evaluation cannot be used to represent the flows in an event-based manner across the network.

A third type of known evaluation, called "hybrid" evaluation, consists of making use of both event-based evaluation and analytical evaluation.

In a hybrid evaluation model, certain elements of the network are simulated with analytical differential equations while other, generally more complex, elements are simulated by means of stochastic modelling with discrete events.

A first principle of hybrid modelling, called the "principle of hybrid modelling by partitioning" consists of dividing the network into sub-parts, with certain sub-parts being processed using analytical models and other sub-parts being processed using event-based models.

For example, all of the traffic sources and frontier nodes of the network (Customer Equipment) are event-base simulated, while the core of the network is simulated analytically (between the "Edge" routers).

This "hybridation" of the evaluation results from the fact that the superimposition of multiple traffic flows (which are individually non-Poissonian) at the level of the "Edge Routers", combine into an aggregate traffic stream that tends toward a Poisson Law. This property has been verified by multiple simulations conducted on different source type. Moreover, the core of the network is often the least loaded part, and the hypotheses or assumptions used give good results in this case.

However, the principle of hybrid modelling with partitioning cannot generally be used to represent an end-to-end traffic stream circulating in the network in an entirely event-based manner, except to use an event-based evaluation for each of the nodes through which the stream passes. However, this would require that each data stream passing through a simulated node should itself also be represented in an event-based manner. The result is a computing load, and processing times, that are prohibitive.

A second principle of hybrid modelling, called the "principle of hybrid modelling by superimposition" consists of simulating, in an event-based manner only, the data streams for which one wishes to precisely evaluate the quality of service, and of using the faster analytical models to evaluate the rest of the load in the network.

This simulation principle allows one to reduce, as much as desired, the computational complexity of the event-based simulation while still maintaining very precise simulations, from end-to-end, for all the packets transmitted in a data stream.

A specific approach of this principle has been proposed in the following document:

*Hybrid simulation of the IP-Diff-Serv-MPLS multi-service networks in a distributed execution environment*, David Gauchard, 25 Apr. 2003, LAAS report No. 03544.

The principle of hybrid modelling by superimposition is illustrated in the simplified case of a node with an input interface with a single queue. The interface firstly receives an analytical flow emitted by an analytical source, and secondly receives an event-based stream (in the form of data packets) emitted by an event-based source.

Although this document states that an evaluation of the network, using the principle of hybrid modelling by superimposition, leads to satisfactory results, it does not present any solution that allows one to apply this hybrid evaluation to the complex cases of nodes with an input interface that includes a multiplicity of queues, in which the queues are managed with just any service law.

SUMMARY OF THE INVENTION

One aim of the invention is to propose a method for the digital evaluation of a data transmission network based on hybrid superimposition and designed to cater for nodes with complex input or output interfaces.

This problem is resolved in the context of this present invention using a method in accordance with claim 1.

Such a method allows one to evaluate performance and to simulate the propagation of the streams of data packets, both analytical and event-based, from one end to the other of the paths traversed by these streams, taking account of the classes of service associated with these data streams, as well as of the service laws and of the complex sequencing laws governing the queues of the interfaces traversed by these streams within the network.

Dependent claims 2 to 12 specify advantageous implementation characteristics of the method of the invention.

The invention also concerns a device according to claim 13.

PRESENTATION OF THE FIGURES

Figure 2:
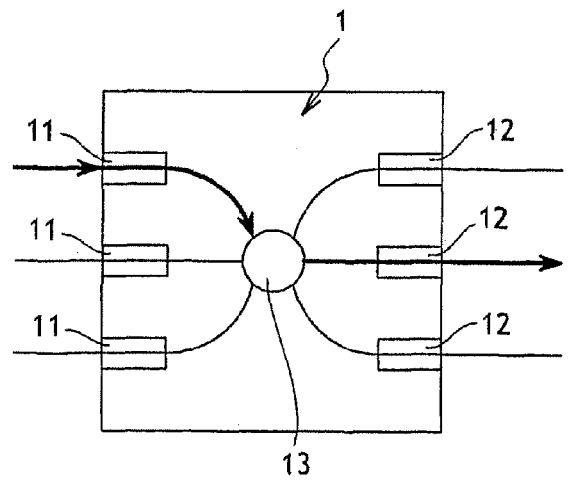
Figure 3:
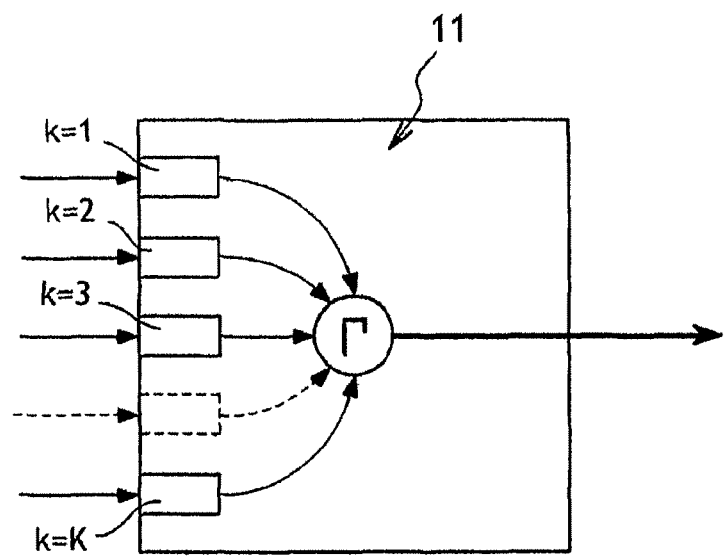
Figure 4:
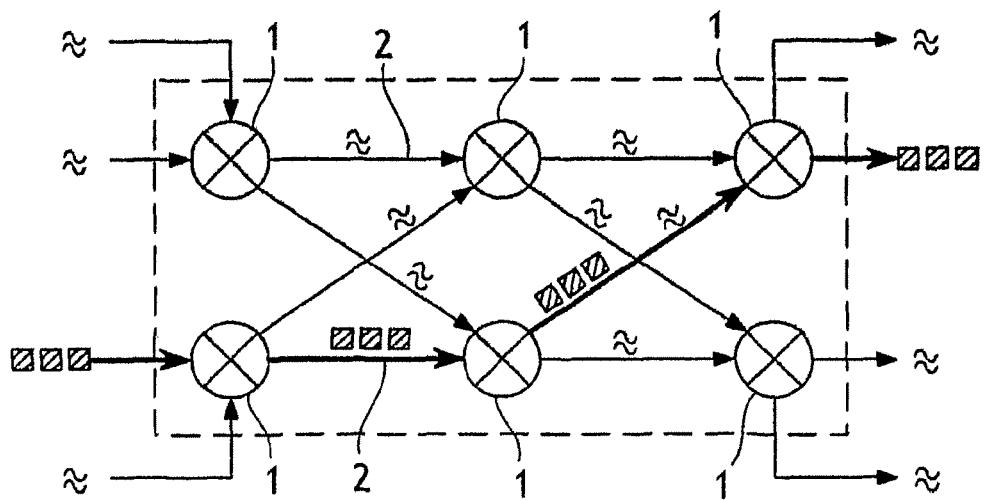
Figure 5:
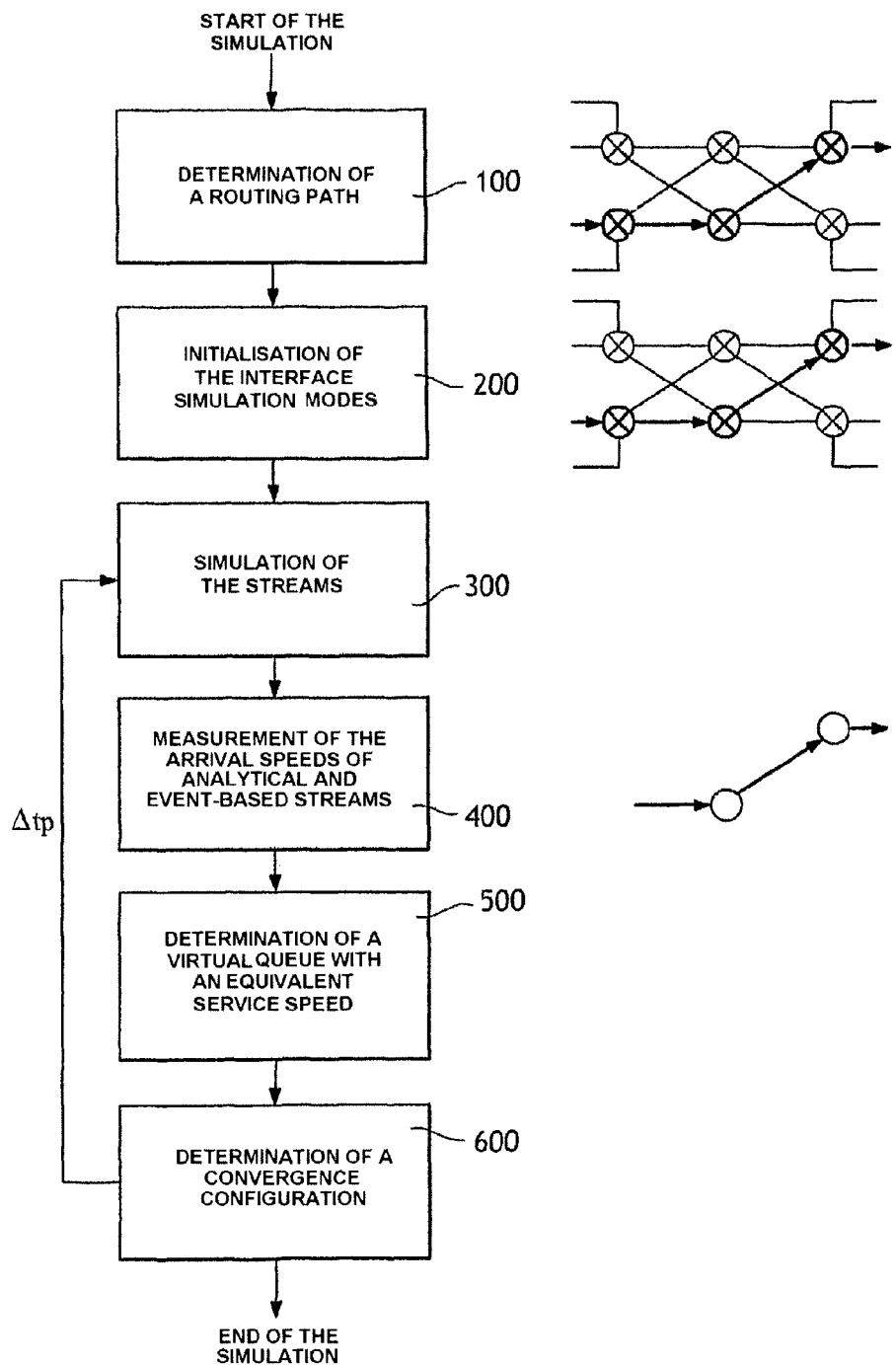
Figure 6:
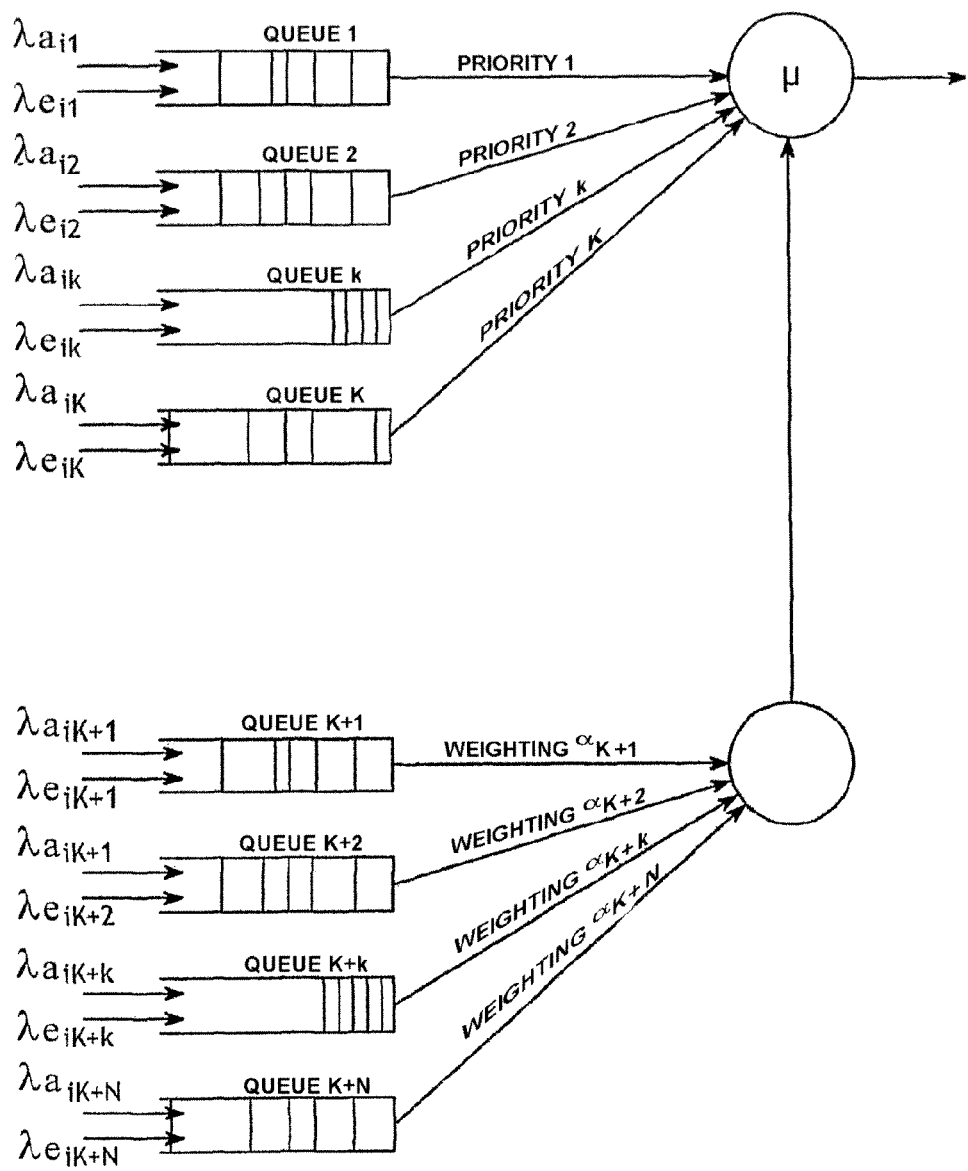
Figure 7:
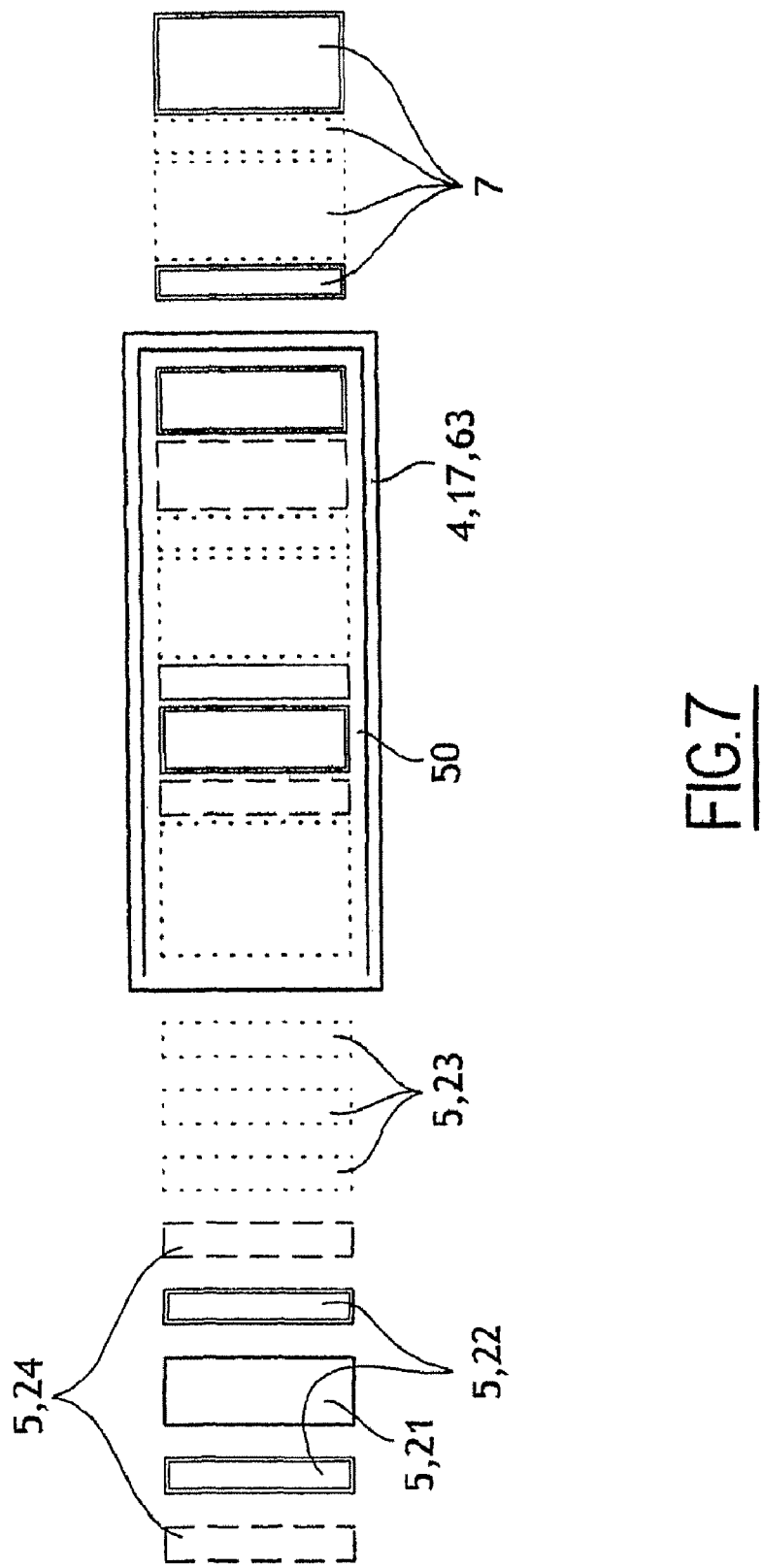
Figure 8:
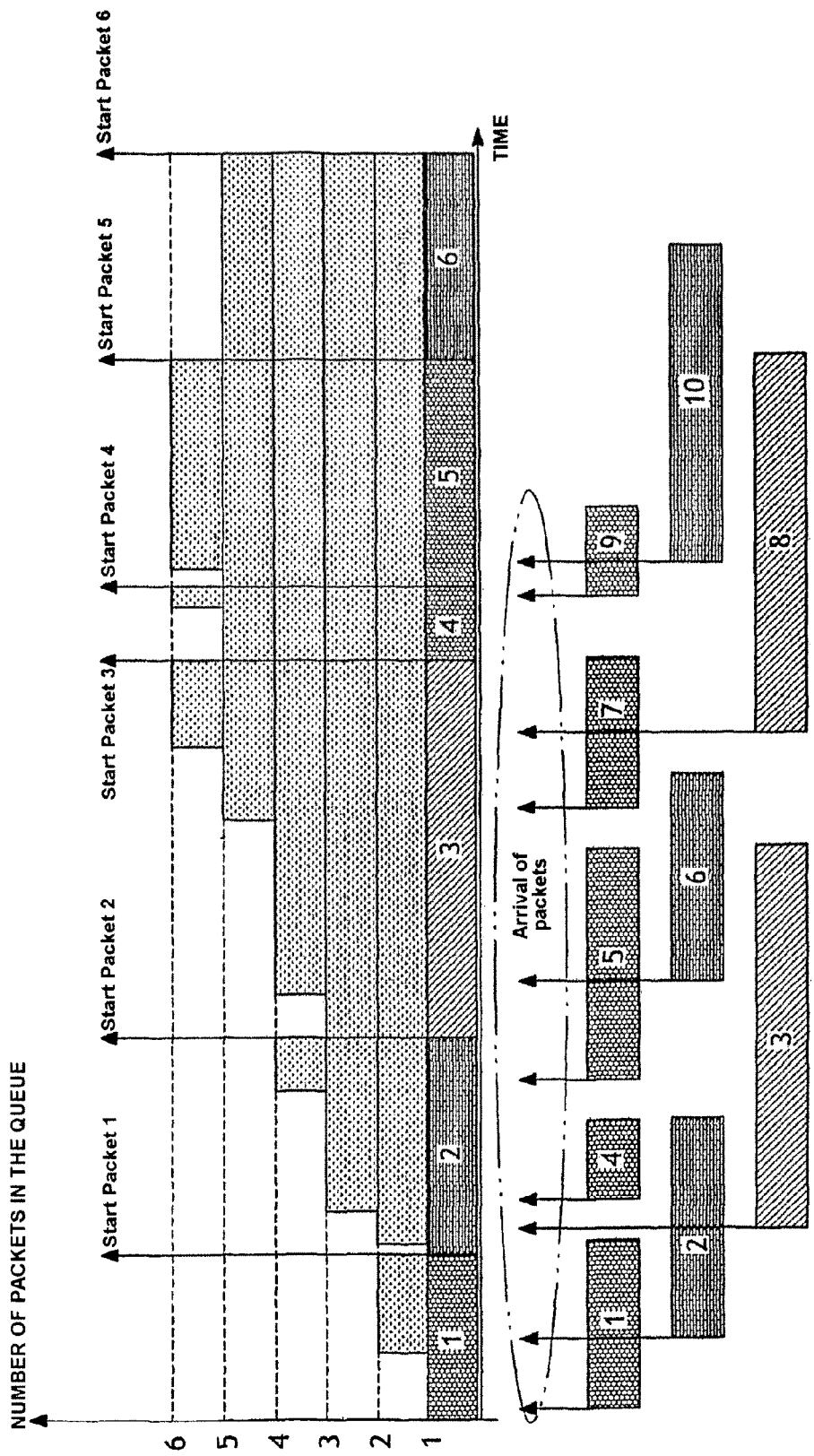
Figure 9:
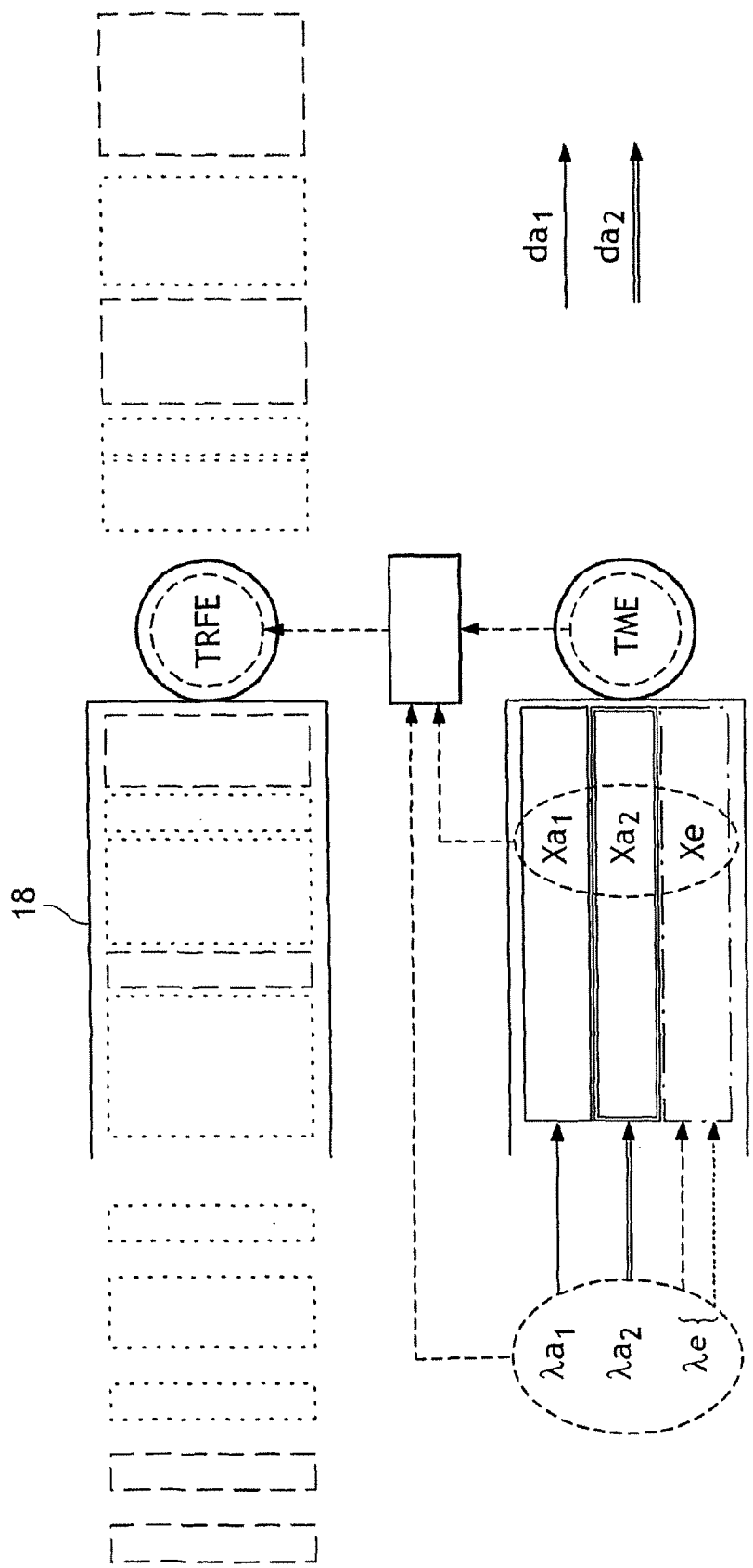
Figure 10:
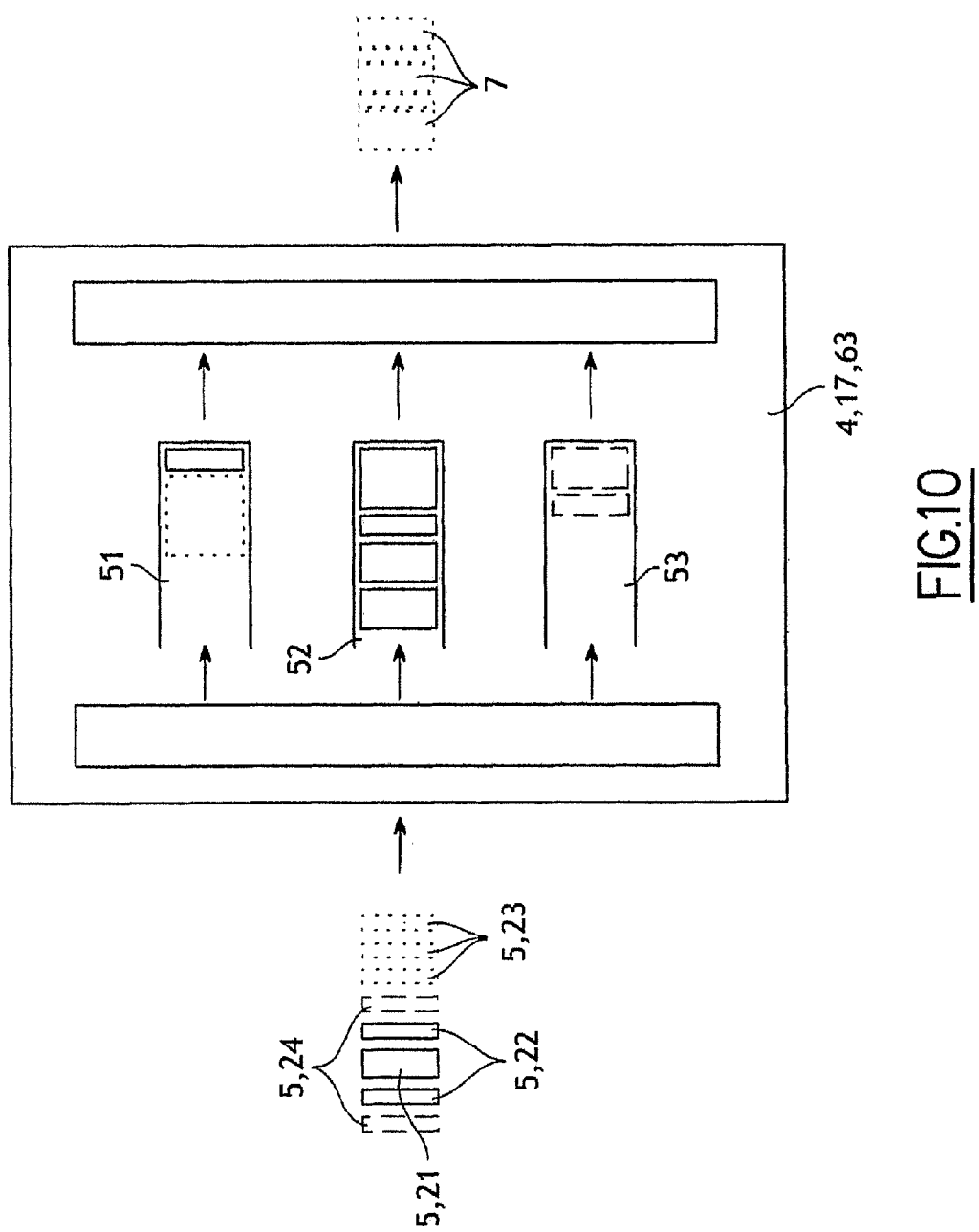
Figure 11:
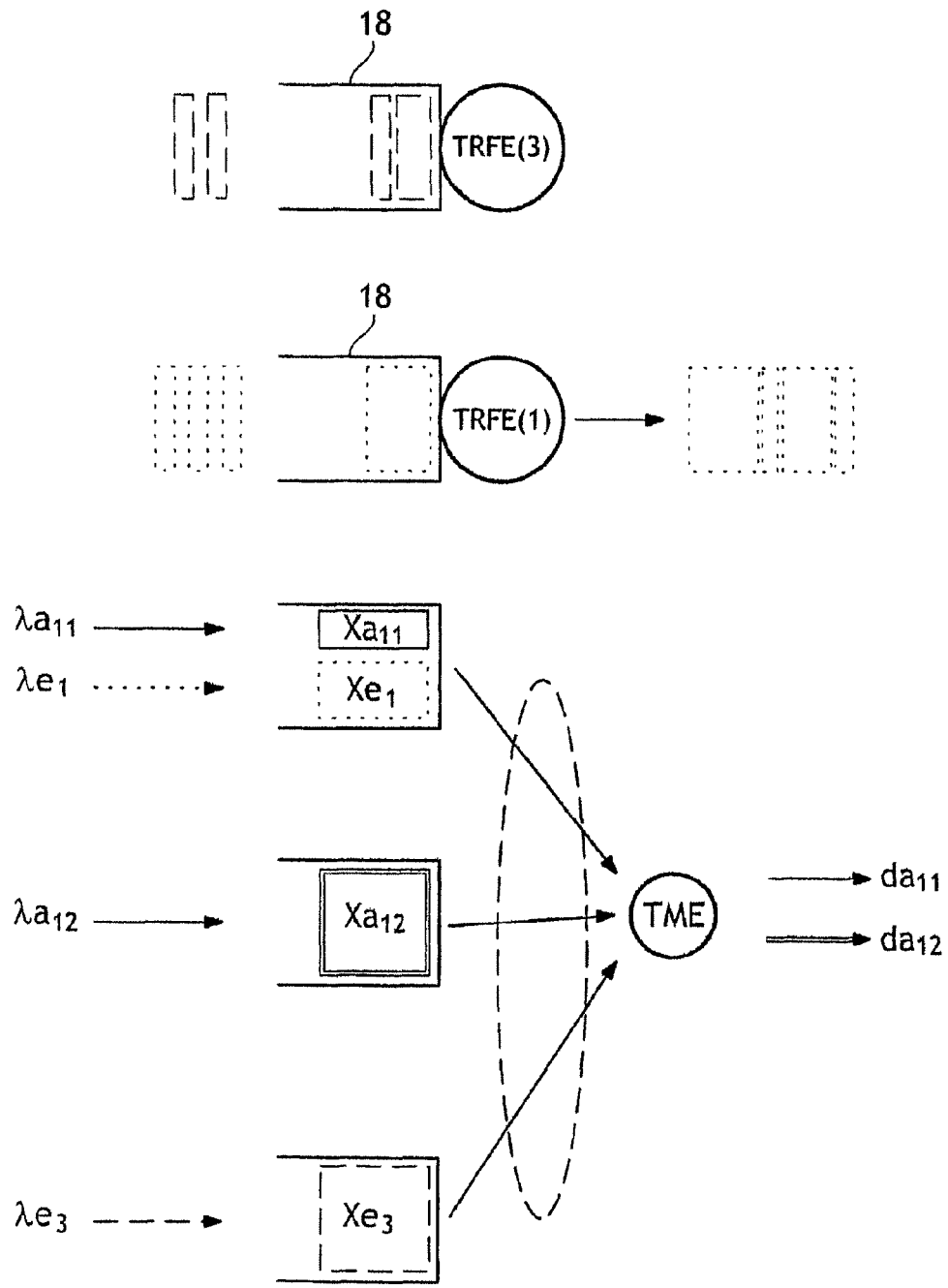

Other characteristics and advantages will emerge more clearly on reading the description that follows, which is purely illustrative and non-limiting, and must be read with reference to the appended figures listed below:

FIG. 1 schematically represents a data transmission network,

FIG. 2 schematically represents a node in the data transmission network,

FIG. 3 schematically represents an input interface of a node,

FIG. 4 schematically represents one application of the principle of hybrid superimposition to a data transmission network, FIG. 5 schematically represents the steps of a method for the digital evaluation of a transmission network, in accordance with one embodiment of the invention, FIG. 6 schematically represents an embodiment of the method corresponding to the case of an interface with a multiplicity of queues managed by a complex service law, FIG. 7 is a diagram illustrating an interface that includes a single incoming packet receive queue, according to a first embodiment of the method of the invention, FIG. 8 is a graph representing the evolution over time of the load on a queue as a function of chronological reception events and of chronological restoration events, FIG. 9 illustrates the principle of hybrid evaluation by superimposition, as applied, according to the first embodiment of the evaluation method of the invention, at the interface of FIG. 7, FIG. 10 is a diagram illustrating an interface implementing priority method of queue management, according to a second embodiment of the method of the invention, FIG. 11 illustrates the principle of hybrid evaluation by superimposition as applied, according to the second embodiment of the evaluation method of the invention, to the port of FIG. 10.

DEFINITIONS

By "node" is meant any hardware device performing the function of routing a data stream in a data transmission network.

By way of an example, an IP router, a computer executing software IP routing, an MPLS switch (Multiprotocol Label Switching), an ATM router (Asynchronous Transfer Mode), an Ethernet switch, or any other device used for the switching of data packets, can constitute a node. In addition, a repeater, such as a device commonly called the "hub", a satellite, or any other device that allows one to transmit data packets, can constitute a node.

By "transmission link" is meant any means used for the transmission of data streams from one node to another in a data transmission network.

A transmission link can take the form of any transmission line, radio link, or other type of resource for the transmission of data between nodes.

By "interface" is meant a port for the input or output of data at a node.

By "analytical operating mode" is meant an operating mode of an interface at a node which is modelled by one or more differential equations obtained via non-linear analytical relations governing the analytical data streams of data passing through the node.

By "event-based operating mode", is meant a mode of operation of an interface modelled by discrete events representing one or more event-based streams passing through the node, and whose mean behaviour can be ascertained through the use of statistical methods.

By "hybrid operating mode" is meant a mode of operation of an interface at a node, governing both the analytical data streams and the event-based data streams.

By "service speed" or "restoration speed" is meant the speed at which data entering at an interface of a node are transmitted (or restored) by the interface.

DETAILED DESCRIPTION OF AN EMBODIMENT OF THE INVENTION

FIG. 1 schematically represents a data transmission network, such as a packet-switched data transmission network for example. The network includes a multiplicity of nodes 1 and a multiplicity of data transmission links 2 extending between the nodes 1.

This network effects the transmission of data packets supplied by packet sources 3 associated with hardware devices, called source hardware devices, and transmitted over the network by these source hardware devices. By way of a non-limiting example, a software application, which is a producer of packets, loaded into the RAM of a hardware device, can constitute such a source of packets. In addition, each packet source 3 can come from a hardware element of the corresponding source hardware device. For example, a port (not shown in the figures) for the transmission of data between the source hardware device and hardware devices (not shown in the figures) outside the network can constitute such a source of packets.

Each packet source 3 produces packets that are routed by the network to a destination hardware device 4 along a single or multiple routing trajectory 5.

FIG. 2 schematically represents a node 1 in the data transmission network.

The node 1 includes at least one input interface (or input port), one output interface 12 (or output port) and a routing module 13 (also called the switching core or switching matrix).

Each input interface 11 is designed to receive data coming from a source or from another node via a link in the network.

Likewise, each output interface 12 is designed to transmit data to another node or destination hardware devices via a link in the network.

The routing module 13 is designed to route data received from an input interface 11 to a output interface 12.

Each interface can also be designed to implement known processes that allow data packets to be rejected before saturation of the buffer memories, such as so-called RED (Random Early Detection) or WRED (Weighted Random Early Detection) mechanisms.

Each interface can also implement known methods known as policies, and known methods describes as CARs, that allow one to limit the speed of certain packet streams.

In addition, each port is able to implement known processes for the shaping of traffic flows.

FIG. 3 schematically represents an input interface 11 of a node 1.

The interface 11 includes a multiplicity of queues (k) (where k=1 ... K) with, for example, FIFO or PAPS memories implementing a queuing discipline of the first-come first-served type.

The queues k receive and store incoming data packets. Each incoming data packet is distributed into one of the files as a function of the class of service associated with the packet. For example, a packet with class k is introduced into the corresponding file k. Each queue is associated with one or more classes of service.

The data packets are taken over by the input interface 11 as a function of a service law F that governs the queues.

FIG. 4 schematically represents one application of the principle of hybrid superimposition to a data transmission network, such as that of FIG. 1.

We simulate, in an event-based manner, a data stream (♦♦♦) with which a given class of service is associated, and for which we wish to precisely evaluate the quality of service. The other streams (≈) are simulated in an analytical manner so as to take account of the rest of the load in the network.

Of the nodes in the network, some have an interface that receives only data in the form of analytical streams (≈). Such an interface is then identified as an interface with an analytical operating mode.

Other nodes have an interface that receives only data in the form of an event-based stream (♦♦♦). Such an interface is then identified as an interface with an event-based operating mode.

Still other nodes have an interface that receives both data in the form of analytical data streams and data in the form of event-based streams. Such an interface is then identified as an interface with a hybrid operating mode.

FIG. 5 schematically represents the main steps of one method for the digital evaluation of the transmission network.

This consists of choosing one or more data streams that will be event-base simulated from one end to the other of their paths across the network, while the rest of the data is simulated with differential equations. This simulation mode allows one to reduce as much as desired the computational complexity of the event-based simulation while still maintaining very precise simulations, from end-to-end, for all the packets transmitted in a data stream.

In a first step 100, we propagate a multiplicity of multi-class streams via all of the nodes and all the interfaces of the nodes through which these streams pass. A routing law (IP routing table or MPLS routing table giving an LSP) allows one to determine via which interfaces all end-to-end multi-class streams pass. These paths are dependent on the destination of the data streams but can also depend on the type of application or service and on the classes of the streams. In an interface, it is the class of a stream that determines the queue to which the packets of the stream will be assigned.

In particular, for a data stream with which a class of service is associated, we determine a routing path that passes through a multiplicity of nodes of the network.

In a second step 200, of the nodes on the routing path and for each event-based data stream, we determine the nodes that have an input interface or an output interface that simultaneously receives at least one event-based data stream and at least one analytical data stream. In other words, we identify the interfaces with a hybrid operating mode.

In a third step 300, we initialise the simulation modes for the interfaces of the nodes. In other words, we determine a simulation mode for each interface. The simulation mode (on the assumption that we keep the same event-based and analytical streams during the simulation). For each interface and each queue at this (multi-class) interface, we resolve the following cases in order to determine its mode

- If all the flows passing through an interface are analytical, the mode of the interface is analytical and the propagation mode of the data streams is completely and only analytical. The mathematical models of the queues at this interface are then "active", with no calculation of an equivalent service speed, without a virtual queue and without an event-based simulation.
- If all the flows passing through an interface are event-based, the mode of the interface is event-based and the propagation mode of the data streams is completely and only event-based. The mathematical models of the queues at this interface are then "de-activated".
- If an interface is traversed by at least one analytical stream and at least one event-based stream, this interface is in hybrid mode.

The queues at this interface in hybrid mode, containing only analytical streams, will be analytical. In fact, the queues at this interface, containing at least one event-based stream, will be either hybrid or event-based.

- Either a queue contains only event-based data streams, in which case it will be simulated as an actual queue but with an equivalent service speed that will be calculated from an aggregated analytical model,
- or a queue contains analytical and event-based data streams, in which case it will be simulated as an actual queue for analytical data streams and by a virtual queue for the event-based data streams, but with an equivalent service speed that will be calculated from an aggregated analytical model. The losses in this virtual queue are effected according to a uniform draw corresponding to the value of the probability of loss calculated by the aggregated analytical model.

In a fourth step 400, we cause the different data streams to propagate across the network.

The queues at all of the interfaces are processed for all the streams:

- The speeds of the analytical data streams are propagated to the following interfaces.
- Each packet event is processed and propagated via the event-based simulation (creation of a new packet from a source, disappearance of a packet reaching the destination, disappearance of a packet lost in a saturated queue, arrival of a packet at a queue of an interface, departure of a packet from an interface to a link, etc).
- The event-based simulations are effected for the actual queues or for virtual queues.

In a fifth step 500, at regular time intervals, we measure the speed of the analytical data streams, we create statistics on the event-based data streams arriving at each queue of each interface, and we deduce from the latter the mean analytical and event-based arrival speeds.

In a sixth step 600, we estimate a convergence parameter of the simulation. If the convergence is not sufficient, we repeat steps 300 to 600 until this convergence is considered to be sufficient.

The fourth step 400 will now be described in greater detail by means of two examples of interfaces operating in hybrid mode.

During this step 400, for each interface with a hybrid operating mode, an equivalent service speed (TREE) is calculated for each queue of the interface receiving at least one event-based data stream.

General Principle—the Case of a Multiplicity of Queues Managed by a Complex Service Law We will look at the general case of an interface, such as that represented in FIG. 6, where the interface has any number of queues, receiving a multiplicity of analytical and event-based data streams. The interface implements combinations of sequencing disciplines of the fixed priority type and of the equitable bandwidth management type with weighting (WFQ or "Wake Fair Queuing" is one example of this).

It is assumed that the queuing discipline in each queue is of the first-come first-served type.

In addition, it is assumed that the incoming packets of the data streams (analytical and event-based) arriving at each queue follow a Poisson process and a service law directly dependent upon the distribution of the packet sizes. This distribution of the packet sizes is of the Independent General type. We also consider an infinite capacity for the queues.

Secondly, the queues are structured into two banks. A first bank contains K queues managed in accordance with a sequencing by priority. A second bank contains N queues managed according to a sequencing by equitable management of bandwidth with weighting.

The queues are as follows: $1, 2 \ldots K, K+1, \ldots, K+N$. In the first bank, the packets of queue 1 are always processed before those of queues 2, 3, . . . , K. Likewise, the packets of queue 2, if queue 1 is empty (no packet present), are always processed before those of queues 3, 4, . . . , K. The same applies to all the queues of the first bank, in which the index indicates not only the number of the queue but also its order of priority.

The packets of queues K+1, K+2, ..., K+N of the second bank are processed when there is no longer any packet waiting in the first K queues. In this case, queues K+1, K+2, ..., K+N share the bandwidth according to the type of algorithm for equitable management of bandwidth according to the weighting $\alpha_i$ associated with each queue k (for k∈{K+1, ... K+N}). These weightings are such that:

$$\sum_{k=K+1}^{K+N} \alpha_k = 1$$

This model covers the following particular cases:
K=1 and N=0: the interface includes a single queue and the packets are processed in first-come first-served order.
K>1 and N=0: the interface includes K queues managed according to a discipline of sequencing by fixed priorities.
K=0 and N>1: the interface includes N queues managed according to a discipline of sequencing by equitable sharing with weighting.
$C_k$ is the capacity of queue k (for k ∈ {1, ... K+N}).

The general principle that will be developed details the calculations of the restoration analytical evaluation data RAED(k) parameters, the load analytical evaluation data LAED(k) load and equivalent service speed TRFE(k) associated with any queue k of the interface. These principles are based on queue models M/G/1 for each queue k of an interface.

We will use the following notations:
$D_k$ is the mean of the incoming packet sizes (given in bits for example) of the event-based and/or analytical data streams of queue k,
$\sigma D_k$ is the second-order moment of the packet sizes (given in bits for example) of the data streams of incoming packets in queue k,
$\sigma D_{e_k}$ is the second-order moment of the packet sizes of the event-based streams of incoming packets in queue k.

A speed value $\lambda_{e_k}$ is calculated for each queue k receiving at least one event-based stream. This value is calculated from event-based reception data (DER) describing chronological reception events of packets of the event-based data streams. The following equation illustrates the principle of its calculation:

$$\lambda_{e_k} = \sum_i \lambda_{e_{ik}}$$

in which $\lambda_{eik}$ is the speed, in number of packets per unit of time, of the event-based streams (i) incoming to queue k.

Preferably, the values $\lambda_{ek}$ each correspond to a mean data speed value over a corresponding mean time interval $\Delta t_p$, at a current iteration of the evaluation method. In practise, each $\lambda_{ek}$ can be obtained by counting the chronological reception events occurring over this interval $\Delta t_p$, and by division of the number obtained by the length of the time interval $\Delta t_p$. The values $\lambda_{ek}$ thus obtained constitute the reception statistical evaluation data (RSED) of each queue (k=1 ... K+N).

Next, a calculation of the load analytical evaluation data (LAED) is effected for the time interval $\Delta t_p$ corresponding to a current iteration of the evaluation method according to one embodiment of the invention as described below.

Let $\lambda_{ak}$ be the speed of incoming packets of the analytical data streams into queue k (preferably in packets per second)

$$\lambda_{a_k} = \sum_i \lambda_{a_{ik}}$$

in which $\lambda_{aik}$ is the speed, in number of packets per unit of time, of incoming packets of each analytical data stream i of queue k.

The values $\lambda_{aik}$ constitute the reception analytical data (RAD) for each queue k=1 ... K+N.

In addition, $$\mu_k = \frac{TME}{D_k}$$

$$\tau_k = \frac{1}{TME^2} \cdot \sigma D_k$$

$$\tau_{e_k} = \frac{1}{TME^2} \cdot \sigma D_{e_k}$$

in which μk is the mean service speed of the packets of the incoming data streams to queue k,
τk is the second-order moment of the service time of the packets of the incoming data streams to queue k, and $\tau_{ek}$ is the second-order moment of the service time of the packets of the event-based data streams in queue k.

These parameters $\mu_k$, $\tau_k$ and $\tau_{ek}$ determine the general service distribution of the packets in queue k.

Let $P_k$ be the probability of loss in queue k. This is calculated using conventional formulae of the $M_k/G_k/1/C_k$ type (which are known from the literature), in which the total incoming flow to queue k is assumed to be Poissonian (M), and the service law is assumed to be Independent General (G), and in which the capacity of the file is $C_k$ (in this regard reference can be made to "Introduction to Queuing Theory", second Edition, Robert B. Cooper, North Holland, 1981. ISBN: 0-444-00379-7, or to "The Single Server Queue", Jacob W. Cohen, North Holland, 1969. ISBN: 0-444-85452-5.

This probability $P_k$ is used for all the analytical data streams of the analytical files of the interface, and also for the analytical and event-based data streams of the hybrid files. In the virtual files, it is used for the uniform drawing of losses of packets in the event-based simulation.

We will now introduce the following relations:

$$\rho_{e_k} = \frac{\lambda_{e_k}}{\mu_k}$$

$$\rho_{a_k} = \frac{\lambda_{a_k}}{\mu_k}$$

$$\rho_{a_{ik}} = \frac{\lambda_{a_{ik}}}{\mu_k}$$

$$\rho_k = \rho_{e_k} + \rho_{a_k}$$

$$\lambda_k = \lambda_{e_k} + \lambda_{a_k}$$

$$W_0 = \sum_{l=1}^{K+N} \frac{\lambda_l \cdot \tau_l}{2}$$

$$W_{e_0} = \sum_{l=1}^{K+N} \frac{\lambda_{e_l} \cdot \tau_{e_l}}{2}$$

-continued $$R_k = \sum_{l=1}^{k-1} \rho_l$$

Let $X_k$ be the total load, in number of packets, in queue k, k∈{1, . . . K}. This load can be broken down into a load $X_{ak}$ induced by the analytical data streams, and a load $X_{ek}$ induced by the event-based data streams, as illustrated by the following formula:

$$X_k = X_{ak} + X_{ek}$$

The calculations that follow are broken down into two main steps.

The first step processes the first bank of queues managed by fixed priorities. The second step processes the second bank of queues managed by equitable management of bandwidth with weighting.

For the first bank of queues, the maximum transmission speed TME is shared according to the method of management of the queues by priorities, sequenced in the order 1, 2, 3, . . . , K.

For the queues k belonging to the first bank, the total load is given by $$X_k = \rho_{a_k} + \rho_{e_k} + \frac{(\lambda_{a_k} + \lambda_{e_k}) \cdot W_0}{(1 - R_k) \cdot (1 - R_k - \rho_{a_k} - \rho_{e_k})}, k \in \{1, \ldots K\}$$

If we consider a queue k containing event-based data streams, the load $X_{ek}$ is given by:

$$X_{e_k} = \rho_{e_k} + \frac{\lambda_{e_k} \cdot W_0}{(1 - R_k) \cdot (1 - R_k - \rho_{a_k} - \rho_{e_k})}, k \in \{1, \ldots K\}$$

For queue k, containing analytical streams, the load $X_{ak}$ is given by $$X_{a_k} = \rho_{a_k} + \frac{\lambda_{a_k} \cdot W_0}{(1 - R_k) \cdot (1 - R_k - \rho_{a_k} - \rho_{e_k})}, k \in \{1, \ldots K\}$$

In addition, the load $X_{ak}$ induced by each analytical data stream i in queue k can be determined for each analytical data stream i using the following equation:

$$X_{a_{ik}} = \rho_{a_{ik}} + \frac{\lambda_{ia_k} \cdot W_0}{(1 - R_k) \cdot (1 - R_k - \rho_{a_k} - \rho_{e_k})}, k \in \{1, \ldots K\}$$

The load values $X_{ek}$, and $X_{aik}$ constitute the load analytical evaluation data (LAED).

This calculation of the load analytical evaluation data is effected, according to the known method for analytical evaluation of a queue (in this regard, reference can be made to "*Differential Traffic Modelling and Distributed Hybrid Simulation*", Jean-Marie Garcia et al, Calculateurs Parallels, volume 13 number 6/2001 page 635 to 664) and corresponds to an iteration of the digital solution method by fixed point used in this method.

A calculation of the restoration analytical evaluation data (RAED) is then effected following calculation of the load analytical evaluation data (LAED). This calculation is effected for each queue k receiving at least one analytical stream i using the following formula:

$$d_{aik} = \lambda_{aik}$$

These values $d_{aik}$ constitute the restoration analytical evaluation data (RAED).

An equivalent service speed parameter TRFE(k) is calculated for each queue k, belonging to the first bank and receiving at least one event-based stream. This parameter TRFE(k) is a solution of the second order system as follows:

$$\text{TRFE}(k)^2 \cdot (X_{e_k} - \lambda_{e_k} \cdot W_{e_0}) - \text{TRFE}(k) \cdot \lambda_{e_k} \cdot (X_{e_k} + 1) + \lambda_{e_k}^2 = 0$$

For the second bank of queues (K+1, K+2, . . . , K+N) maximum transmission speed (TME) is shared according to the equitable bandwidth management method with weighting for the queues.

We now introduce the following intermediate calculations:

$$A_k = \rho_k + \frac{\lambda_k \cdot W_0}{(1 - R_{K+1}) \cdot (1 - \rho_k - R_{K+1})}$$

$$X = \sum_{l=1}^{K+N} \rho_l + \frac{W_0 \cdot \sum_{l=1}^{K+N} \lambda_l}{\left(1 - \sum_{l=1}^{K+N} \rho_l\right)}$$

$$B_k = X - \sum_{l=1}^{K} X_l - A_k$$

$$\gamma_{i,l} = \frac{\rho_i}{\sum_{j=K+1, j \neq l}^{K+N} \rho_j}$$

$$Z_k = B_{k \oplus (N-1)} \cdot \gamma_{k, k \oplus (N-1)}$$

in which the operator ⊕ is defined by the following modulo operation:

$$k \oplus j = K+1+[\{k+j-(K+1)\} \bmod N]$$

Let $X_k$ be the total load, in number of packets, in queue k, k∈{K+1, . . . K+N}, of the second bank. As for the first bank, this load can be broken down into a load $X_{ak}$ induced by the analytical data streams and a load $X_{ek}$ induced by the event-based data streams, as illustrated by the following formula:

$$X_k = X_{ak} + X_{ek}, k \in \{K+1, \ldots K+N\}$$

For queues k belonging to the second bank, the total load is given by:

$$X_k = \alpha_k \cdot [A_k - Z_k] + \sum_{j=K+1}^{K+N-2} \alpha_{k \oplus j} \cdot [B_{k \oplus j} \cdot \gamma_{k, k \oplus j} - Z_k] + Z_k,$$

$$k \in \{K+1, \ldots K+N\}$$

For queues k belonging to the second bank, the analytical load is given by:

$$X_{a_k} = \rho_{a_k} + \frac{\lambda_{a_k}}{\lambda_k}[X_k - \rho_k], k \in \{K+1, \ldots K+N\}$$

For queues k belonging to the second bank, the event-based load is given by:

$$X_{e_k} = \rho_{e_k} + \frac{\lambda_{e_k}}{\lambda_k} \cdot [X_k - \rho_k], k \in \{K+1, \ldots K+N\}$$

We need to consider two particular cases, in which N=2 and N=1, meaning the cases in which the files of the second bank with equitable management of bandwidth with weighting are either two or one in number.

The N=2 case gives a new and different equation for the total load of files k, for k ∈ {K+1, ... K+N}, and with the equation for the analytical and event-based load remaining the same:

$$X_k = (A_k + A_{k+1} - X) \cdot \alpha_k - A_{k+1} + X$$

$$X_{a_k} = \rho_{a_k} + \frac{\lambda_{a_k}}{\lambda_k} \cdot [X_k - \rho_k] - \left[\rho_{a_k} - \frac{\lambda_{a_k}}{\lambda_k} \cdot \rho\right], k \in \{K+1, K+2\}$$

$$X_{e_k} = \rho_{e_k} + \frac{\lambda_{e_k}}{\lambda_k} \cdot [X_k - \rho_k] - \left[\rho_{e_k} - \frac{\lambda_{e_k}}{\lambda_k} \cdot \rho\right], k \in \{K+1, K+2\}$$

Case N=1 gives a different equation for the total load of files k, for k∈{K+1}, with the equation for the analytical and event-based load remaining the same. In fact in this case, there is no longer any equitable management of bandwidth with weighting between the queues of the second bank, since this second bank reduces to a single queue. In this case, queue K+1 is seen as a priority file with index K+1:

$$X_{K+1} = \rho_{a_{K+1}} + \rho_{e_{K+1}} + \frac{(\lambda_a + \lambda_{e_{K+1}}) \cdot W_0}{(1 - R_{K+1}) \cdot (1 - R_{K+1} - \rho_{a_{K+1}} - \rho_{e_{K+1}})}$$

If we consider queue K+1, composed of event-based data streams, then the load $X_{ek}$ is given by:

$$X_{e_{K+1}} = \rho_{e_{K+1}} + \frac{\lambda_{e_{K+1}} \cdot W_0}{(1 - R_{K+1}) \cdot (1 - R_{K+1} - \rho_{a_{K+1}} - \rho_{e_{K+1}})}$$

For queue K+1, composed of analytical data streams, the load $X_{ak}$ is given by:

$$X_{a_{K+1}} = \rho_{a_{K+1}} + \frac{\lambda_{a_{K+1}} \cdot W_0}{(1 - R_{K+1}) \cdot (1 - R_{K+1} - \rho_{a_{K+1}} - \rho_{e_{K+1}})}$$

Furthermore, the load $X_{aik+1}$ induced by each analytical data stream i into queue K+1 can be determined for each analytical data stream i by means of the following equation:

$$X_{a_{iK+1}} = \rho_{a_{iK+1}} + \frac{\lambda_{a_{iK+1}} \cdot W_0}{(1 - R_{K+1}) \cdot (1 - R_{K+1} - \rho_{a_{K+1}} - \rho_{e_{K+1}})}$$

For all the cases described above for the second bank of queues k, k∈{K+1, ... K+N}, sequenced by equitable management of bandwidth with weighting, and for queues k traversed at least by an event-based stream at speed $\lambda_{ek}$, a equivalent service speed parameter TRFE(k) is calculated by solving the following second-order system:

$$TRFE(k)^2 \cdot (X_{e_k} - \lambda_{e_k} \cdot W_{e_0}) - TRFE(k) \cdot \lambda_{e_k} \cdot (X_{e_k} + 1) + \lambda_{e_k}^2 = 0$$

During implementation of the method, calculation of the reception statistical evaluation data RSED, calculation of the lead analytical evaluation data LAED, calculation of the restoration analytical evaluation data RAED, and calculation of the TRFE(k) parameters is repeated for each iteration of the evaluation step 400 of the method.

Example 1

In the first example and the second embodiment of the evaluation method of the invention, the third stream 43 and the fourth stream 44 of the port 4 each constitutes an event-based stream, while the first stream 41 and the second stream 42 each constitutes an analytical flow.

FIG. 7 represents the port 4 of the hardware device 16 according to the first embodiment of the evaluation method of the invention. FIG. 6 represents the principle of hybrid evaluation by superimposition as effected in the first embodiment of the evaluation method of the invention.

This first example is a particular application of the generic model in the case in which K=1 and N=0.

In this example the queuing discipline in the queue is of the first-come first-served type. It is also assumed that the incoming packets of the event-based and analytical data streams arrive according to a Poisson process, and that the size of the packets in these streams (analytical and event-based) follow a General Independent distribution with a mean of D and a second-order moment σD. We will denote as σDe the second-order moment of the aggregated stream of packets corresponding to event-based data streams 43 and 44.

In this first example, a single value λe of incoming speed is calculated for all of the event-based data streams 43, 44. This value is calculated and stored from event-based reception data DER describing chronological reception events of packets 23, 24 from the event-based data streams 43, 44. The following equation demonstrates this calculation:

$$\lambda e = \lambda e_{43} + \lambda e_{44}$$

in which $\lambda e_{43}$ and $\lambda e_{44}$ are the speeds, in number of packets per unit of time, of incoming packets of the event-based data streams, 43 and 44 respectively.

Preferably, the value λe corresponds to a mean data speed value over a time interval $\Delta t_p$, as described below, corresponding to a current iteration of the evaluation method of the invention. In practise, λe can be obtained by counting the chronological reception events occurring over this interval $\Delta t_p$, and by division of the number obtained by the length of the time interval $\Delta t_p$. In this example, the value λe thus calculated constitutes the reception statistical evaluation data RSED.

By way of illustration, FIG. 8 is a graph representing, on the y-axis, the evolution over time, represented on the x-axis, of the load, in number of packets, of a virtual queue, as described below, of first-come first-served packet types as a function of chronological packet reception events and of chronological packet restoration events. Each chronological packet reception event is shown by an arrow whose position on the x-axis indicates the date of reception of the packet.

Following the calculation of the reception statistical evaluation data RSED, a calculation of the load analytical evaluation data LAED is effected for the time interval $\Delta t_p$, as described below, corresponding to a current iteration of the evaluation method of the invention. In this example, this calculation is effected according to an analytical model, of the M/G/1 type, of the queue.

Let $\lambda$ be the total speed of the incoming packets of the event-based data streams and of the analytical data streams in the buffer memory, and $\lambda a$ be the speed of total incoming packets of the analytical data streams of the queue $$\lambda = \sum_i \lambda a_i + \sum_j \lambda e_j,$$

$$\lambda a = \sum_i \lambda a_i,$$

in which $\lambda a_i$ is the speed, in number of packets per unit of time, of the incoming packets of each analytical data stream i= 41, 42 of the queue.

In this example, these values $\lambda a_i$ constitute the reception analytical data RAD.

Let $\mu$ be the mean packet restoration speed of the data streams of incoming packets into the buffer memory (with the mean processing time of a packet being $1/\mu$):

$$\mu = \frac{TME}{\mu}$$

Note that:

$$\rho = \frac{\lambda}{\mu}$$

$$\rho a_i = \frac{\lambda a_i}{\mu}$$

$$\rho e_j = \frac{\lambda e_j}{\mu}$$

$$\rho a = \sum_i \rho a_i, \text{ and}$$

$$\rho e = \sum_j \rho e_j.$$

In addition:

$$\tau_e = \frac{\sigma De}{TME^2}$$

$$\tau = \frac{\sigma D}{TME^2}$$

$\tau$ is the second-order moment of the service time of the packets of the data streams (analytical and event-based) incoming to the queue. $\tau_e$ is the second-order moment of the service time of the packets of the event-based data streams 43 and 44 incoming to the queue.

By applying the generic calculations described prior to this example, we get:

$$W_0 = \frac{\lambda \cdot \tau}{2}$$

$$W_{e_0} = \frac{\lambda_e \cdot \tau_e}{2}$$

$$R = 0$$

In this example, the total load of the buffer memory is given by:

$$X = \rho + \frac{\lambda^2 \cdot \tau}{2 \cdot (1 - \rho)}$$

This load can be broken down into a load Xa, induced by the analytical data streams, and a load Xe, induced by the event-based data streams, as illustrated by the following formula:

$$X = Xa + Xe$$

The load Xe induced by the event-based data streams in the queue can be determined by the following formula:

$$Xe = \rho e + \lambda e \cdot \frac{\lambda \cdot \tau}{2 \cdot (1 - \rho)}$$

In addition, the load $Xa_i$, induced in the queue, is determined for each analytical data stream (i) according to the following equation:

$$Xa_i = \rho a_i + \lambda a_i \cdot \frac{\lambda \cdot \tau}{2 \cdot (1 - \rho)}$$

Thus, a value $Xa_1$ representing the load induced by the first stream 41 in the queue, a value $Xa_2$, representing the load induced by the second stream 42 in the queue, and a value Xe representing the load induced by the event-based data streams 43, 44 in the queue, are calculated and stored for port 4.

In this first example, the values $Xa_1$, $Xa_2$, and Xe constitute the load analytical evaluation data LAED. In practise, in this example, the calculation of these values is effected according to the known method for analytical evaluation of a queue (please see "Differential Traffic Modelling and Distributed Hybrid Simulation", Jean-Marie Garcia et al, *Calculateurs Parallels*, volume 18 number 3/81 pages 635 to 664) and correspond to an iteration of a digital solution method by fixed points used in this method.

A calculation of restoration analytical evaluation data RAED can then be effected following calculation of the load analytical evaluation data LAED. This calculation is effected using the following formula:

$$da_i = \lambda a_i$$

in which $da_i$ is the outgoing packet speed 7 of data from analytical stream i.

Thus, a value $da_1$ representing the outgoing packet speed 7 from the first stream 41 as well as a value $da_2$ representing the outgoing packet speed 7 from the second stream 42 are calculated and stored for port 4. These values, $da_1$ and $da_2$ constitute the restoration analytical evaluation data RAED.

In this example, following the calculation of the load analytical evaluation data, a speed parameter TRFE of restoration by the queue of outgoing packets 7 from the third stream 43 and from the fourth stream 44 is calculated by solving the following second-order system:

$$TRFE^2 \cdot \left(Xe \frac{\lambda e \cdot \tau_e}{2}\right) - TRFE \cdot \lambda e(Xe + 1) + \lambda e^2 = 0$$

In a sub-step for evaluating the transmission of the event-based data streams as described below, this TRFE parameter allows us to calculate the dates of the chronological restoration events.

Example 2

FIG. 10 represents port 4 of the hardware device 16 in the second embodiment of the evaluation method of the invention. FIG. 11 represents the principle of hybrid evaluation by superimposition as effected in the second embodiment of the evaluation method of the invention.

In this example, the queuing discipline is of the first-come first-served type. In addition, it is assumed in this second example that the incoming packets of the data streams (analytical and event-based) arriving at each buffer memory follow a Poisson process and a service law directly dependent upon the distribution of the packet sizes. In this example, this distribution of the packet sizes is of the General Independent type. In addition, we assume an infinite capacity for the queues.

Secondly, the buffer memories are managed according to a sequencing by priorities. In such a type of sequencing, the packets of queue 1 are always processed before those of queues 2, 3, ... K, in which K is the number of queues at the port. Likewise, the packets of buffer memory 2, if buffer memory 1 is empty (no packets present), are always processed before those of buffer memories 3, 4, ... K. The same applies to all the buffer memories, in which the index indicates not only the number of the queue but also its order of priority. This example illustrates the calculation of each TRFE(k) parameter associated with a queue k at the port.

This example is a particular application of the generic model in the case in which K=3 and N=0.

Consider the following notations:

$D_k$ is the mean of the incoming packet sizes (given in bits for example) from the event-based and/or analytical data streams (1) of queue k, $\sigma D_k$ is the second-order moment of the packet sizes (given in bits for example) of the data streams of incoming packets of queue k, $\sigma De_k$ is the second-order moment of the packet sizes of the event-based data streams of incoming packets in queue k.

In this particular case the maximum transmission speed TME is shared according to the priority method of queue management, sequenced in the order 1, 2, 3, ..., K.

In this second example, a value $\lambda e_R$ is calculated for each queue receiving at least one event-based stream. This value is calculated from event-based reception data DER describing chronological reception events of packets of the event-based data streams. The following equation illustrates the principle of its calculation:

$$\lambda e_k = \sum_j \lambda e_{jk}$$

in which $\lambda e_{jk}$ is the speed, in number of packets per unit of time, of incoming packets of each event-based data stream j of queue k.

Thus, a value $\lambda e_1$ of incoming speed of the third stream 43 in the first queue 51, and a value $\lambda e_3$ of incoming speed of the fourth stream 44 in the third queue 53, are obtained.

Preferably, these $\lambda e_k$ values each corresponds to a mean data speed value over a time interval $\Delta t_p$, as described below, corresponding to a current iteration of the evaluation method of the invention. In practise, each $\lambda e_K$ can be obtained by counting the chronological reception events occurring over this interval $\Delta t_p$ and by division of the number obtained by the length of the time interval $\Delta t_p$. In this second example, the values $Ae_1$ and $Ae_3$ thus obtained constitute the reception statistical evaluation data RSED.

Following the calculation of the reception statistical evaluation data RSED, a calculation of the load analytical evaluation data LAED is effected for the time interval $\Delta t_p$, as described below, corresponding to a current iteration of the evaluation method of the invention. In this example, this calculation is effected according to an analytical model of the M/G/1 type for each queue k.

Let $\lambda a_k$ be the speed of the incoming packets of the analytical data streams into queue k (preferably in packets per second):

$$\lambda a_k = \sum_i \lambda a_{ik}$$

in which $\lambda a_{ik}$ is the speed, in number of packets per unit of time, of incoming packets of each analytical data stream i of queue k.

In this example, these $\lambda a_{ik}$ values constitute the reception analytical data RAD.

In addition:

$$\mu_k = \frac{TME}{D_k}$$

$$\tau_k = \frac{\sigma D_k}{TME^2}$$

and $$\tau e_k = \frac{\sigma De_k}{TME^2}$$

in which $\mu_k$ is the mean service speed of the packets of the incoming data streams to queue k, $\tau_k$ is the second-order moment of the service time of the packets of the incoming data streams to queue k, and $\tau e_k$ is the second-order moment of the service time of the packets of the event-based incoming data streams to queue k.

For each queue k, we calculate the following quantities:

$$\rho e_k = \frac{\lambda e_k}{\mu_k} \text{ and } \rho a_k = \frac{\lambda a_k}{\mu_k},$$

$$R_k = \sum_{l=1}^{k-1} \rho e_l + \rho a_l.$$

We also calculate the following quantities:

$$W_0 = \sum_{l=1}^{K} \frac{(\lambda a_l + \lambda e_l) \cdot \tau_l}{2}$$

$$We_0 = \sum_{l=1}^{K} \frac{\lambda e_l \tau e_l}{2}$$

Let $X_k$ be the total load, in number of packets, in queue k. This load can be broken down into a load $Xa_k$ induced by the analytical data streams, and a load $Xe_k$ induced by the event-based data streams, as illustrated by the following formula:

$$X_k = Xa_k Xe_k$$

In this example, the total load of buffer memory k is given by:

$$X_k = \rho a_k + \rho e_k + \frac{(\lambda a_k + \lambda e_k)^* Wo}{(1-R_k)(1-R_k-\rho a_k-\rho e_k)}$$

If we consider a buffer memory k composed of at least one event-based stream, then load $Xe_k$ is given by:

$$Xe_k = \rho e_k + \frac{\lambda e_k \cdot Wo}{(1-R_k)(1-R_k-\rho a_k-\rho e_k)}$$

In addition, the load $Xa_{ik}$ induced by each analytical data stream i in queue k can be determined for each analytical data stream i according to the following equation:

$$Xa_{ik} = \rho a_{ik} + \frac{\lambda a_{ik} \cdot Wo}{(1-R_k)(1-R_k-\rho a_k-\rho e_k)}$$

Thus, an analytical load, $Xa_{11}$, representing the load induced by the first stream 41 in the first queue 51, and an analytical load, $Xa_{12}$, representing the load induced by the third stream 43 in the first queue 51, are calculated. In addition, an event-based load, $Xe_2$, representing the load induced by the second stream 42 in the second queue 52, and an event-based load, $Xe_3$, representing the load induced by the fourth stream 44 in the third queue 53, are calculated. These load values, namely $Xe_1$, $Xa_{11}$, $Xa_{12}$ and $Xe_3$ constitute the load analytical evaluation data LAED. Note in this example that the values of $Xe_2$ and $Xa_{13}$ are zero, since no event-based streams correspond to the second queue 52 and no analytical flow corresponds to the third queue 53.

This calculation of the load analytical evaluation data is effected, in this second example, according to the known method of analytical evaluation of a queue (please see "Differential Traffic Modelling and Distributed Hybrid Simulation", Jean-Marie Garcia et al, Calculateurs Parallels, volume 13, number 6/2001, page 635 to 664) and correspond to an iteration of the digital solution method with fixed point, used in this method.

A calculation of the restoration analytical evaluation data RAED is then effected following the calculation of the load analytical evaluation data (LAED). This calculation is effected for each queue k receiving at least one analytical flow i using the following formula:

$$da_{ik} = \lambda a_{ik}$$

Thus, a value $da_{11}$, representing the outgoing packet speed 7 from the first stream 41 in the first queue 51, as well as a value $da_{12}$, representing the outgoing packet speed 7 from the second stream 42 are calculated and stored for port 4 in this example. These values, $da_{11}$ and $da_{12}$, constitute restoration analytical evaluation data RAED.

In this example, a TRFE(k) parameter is calculated for each queue k receiving at least one event-based stream, meaning for queues 51 and 53. Thus, a TRFE(1) parameter is calculated for the first queue 51, and a TRFE(3) parameter is calculated for the third queue 53. These TRFE(k) parameters are solutions of the following second-order system:

$$TRFE(k)^2 \cdot (Xe_k - \lambda e_k We_o) - TRFE(k) \cdot \lambda e_k (Xe_k + 1) + \lambda e_k^2 = 0$$

In this second embodiment, the calculation of the reception statistical evaluation data (RSED), the calculation of the load analytical evaluation data LAED, the calculation of the restoration analytical evaluation data RAED, and the calculation of the parameters TRFE(1) and TRFE(3), is repeated for each iteration of the evaluation step, described below, of the evaluation method of the invention.

Parameters TRFE(1) and TRFE(3) are thus calculated and stored with a view to evaluating the transmission of the event-based data streams of the subsequent iteration of the evaluation step, as described below.

The invention claimed is:

1. A method or the digital evaluation of a data transmission network with a multiplicity of nodes (1) and of data transmission links (2) extending between the nodes (1), each node (1) including at least one input or output interface (11, 12) with a multiplicity of queues, each queue being designed to receive data in the form of an analytical or event-based data stream, the data flow being divided between the queues as a function of classes of service associated with the stream, the method implemented using a digital computer programmed to perform the steps of:
   identifying interfaces with a hybrid operating mode, each receiving at least one event-based data stream and at least one analytical data stream, for each interface with a hybrid operating mode, determining,
   for the event-based data stream, a given class of service (k) received by the interface, a virtual equivalent queue associated with the given class of service (k), the virtual equivalent queue having an equivalent service speed (TRFE(k)), with a view to evaluating the data transmission network by associating, with the interface, the virtual equivalent queue receiving the event-based data stream with the given class of service (k),
   wherein the step for determining a virtual equivalent queue includes sub-steps of:
   converting the event-based data stream with a class of service (k) received by the interface into an equivalent analytical stream ($\lambda_{ek}$), and
   determining the equivalent service speed (TRFE(k)) as a function of a service law ($\Gamma$) governing the data flow received by the interface and taking account of the equivalent analytical data stream.

2. The method according to claim 1, including a preliminary step of determining, for a multiplicity of data streams including analytical data streams and event-based data streams, with which are associated classes of service (k) and routing paths, each path passing through a multiplicity of node interfaces.

3. The method according to claim 1, wherein the service law ($\Gamma$) takes account of the analytical data stream and the equivalent analytical data streams of different classes of service (k=1 ... K) divided between the different queues at the interface (11, 12).

4. The method according to claim 1, wherein the step for determining an equivalent service speed includes a sub-step of:
   aggregating the equivalent analytical stream ($\lambda e_k$) with analytical flow ($\lambda a_k$) received by the same queue (k) as the event-based data stream, solving a system of aggregated analytical equations dependent upon the service law ($\Gamma$), as a function of the aggregated analytical data streams.

5. The method according to claim 4, wherein solution of the aggregated equation system leads to the acquisition of a number of data packets aggregated in a given queue (k).

6. The method according to claim 4 or 5, wherein the equation system takes account of the following parameters:
- a value for the mean size of data packets,
- a value for the size variance of data packets,
- a mean value for the arrival speeds of data packets for each data stream, and/or
- a sequencing applied to the queues of the interface.

7. The method according to claim 1, wherein the step for determining an equivalent service speed (TRFE(k) takes account of the following parameters:
- a mean of the packet sizes ($D_k$) of the data streams received by queue (k) of the interface,
- second-order moments of packet sizes ($\sigma D_k, \sigma De_k$) of the data streams received by queue k,
- an overall service speed (TME) associated with the interface,
- a service law ($\Gamma$) associated with the interface, and/or
- a parameter for the capacity ($C_k$) of a queue at the interface.

8. The method according to claim 1, wherein the interface is broken down into a first bank containing K queues managed according to a sequencing by priorities, and a second bank containing N queues managed according to a sequencing by equitable management of bandwidth with weighting ($\alpha_k$).

9. The method according to claim 8, including the steps of:
resolving the second bank, by determining, for each queue (k, k$\in${1, ... N}) of the first bank, the load values associated with the event-based ($Xe_k$) data streams and analytical ($Xa_{ik}$) data streams received in the file, by treating the second bank as a K+1th queue of the first bank, then
resolution of the first bank, consisting of determining, for each queue (k, k$\in${N+1, ... N+K}) of the second bank, load values associated with the event-based data streams ($Xe_k$) and analytical data streams ($Xa_{ik}$) received in the file.

10. The method according to claim 8 or 9, wherein the step for resolving the second bank further comprises:
- calculating an overall load of the N queues of the second bank, for each queue k of the second bank,
- determining a minimum elementary load and a maximum remaining load, by considering that the weighting coefficient of file k is maximum, and that a weighting coefficient of the queues other than k of the second bank is minimum, and then dividing the remaining load of the queues other than k in proportion to a rate of use $\rho_K$ of these queues, from the overall load, the minimum load, and the maximum load for each queue of the second bank,
- performing a multilinear interpolation between the 2*N minimum and maximum values with the known values of the weighting coefficient $\alpha_k$ of queues k.

11. The method according to claim 1, wherein the step for determining an equivalent service speed (TRFE (k)) is repeated at regular time intervals ($\Delta t_p$).

12. A device for the digital evaluation of a data transmission network, the device including a processing unit designed to execute the steps of the method according claim 1.

* * * * *

UNITED STATES PATENT AND TRADEMARK OFFICE
CERTIFICATE OF CORRECTION

PATENT NO. : 8,305,915 B2  Page 1 of 1
APPLICATION NO. : 11/886414
DATED : November 6, 2012
INVENTOR(S) : Olivier Brun, Jean-Marie Garcia and David Gauchard It is certified that error appears in the above-identified patent and that said Letters Patent is hereby corrected as shown below:

In the Claims, Column 21, Claim 7, line 15, delete "(TRFE(k") and insert --(TRFE(k))--.

Signed and Sealed this
Thirtieth Day of April, 2013

Teresa Stanek Rea
*Acting Director of the United States Patent and Trademark Office*